United States Patent
Mounetou et al.

(10) Patent No.: US 8,201,524 B2
(45) Date of Patent: Jun. 19, 2012

(54) METHOD AND DEVICE FOR CONTROLLING THE INITIAL OPENING OF A THERMOSTAT REGULATING THE TEMPERATURE OF AN INTERNAL COMBUSTION ENGINE

(75) Inventors: Christophe Mounetou, Malakoff (FR); Franck Pinteau, Antony (FR); Emmanuel Premier, Bretigny sur Orge (FR); Francis Boutonnet, Boulogne-billancourt (FR); Vasco Afonso, Cerny (FR); Franck Breuille-Martin, Ballancourt (FR)

(73) Assignee: Renault S.A.S., Boulogne Billancourt (FR)

( * ) Notice: Subject to any disclaimer, the term of this patent is extended or adjusted under 35 U.S.C. 154(b) by 907 days.

(21) Appl. No.: 12/161,590

(22) PCT Filed: Jan. 18, 2007

(86) PCT No.: PCT/FR2007/050662
§ 371 (c)(1),
(2), (4) Date: Oct. 23, 2008

(87) PCT Pub. No.: WO2007/083064
PCT Pub. Date: Jul. 26, 2007

(65) Prior Publication Data
US 2009/0301408 A1    Dec. 10, 2009

(30) Foreign Application Priority Data

Jan. 19, 2006   (FR) ..................... 06 00486

(51) Int. Cl.
*F01P 7/14* (2006.01)

(52) U.S. Cl. .............. 123/41.1; 307/9.1; 236/34.5

(58) Field of Classification Search ........... 123/41.1; 307/9.1; 236/34.5
See application file for complete search history.

(56) References Cited

U.S. PATENT DOCUMENTS

| | | | |
|---|---|---|---|
| 5,494,005 A | 2/1996 | Saur | |
| 5,529,025 A | 6/1996 | Ranzinger et al. | |
| 5,758,607 A * | 6/1998 | Brendel et al. | 123/41.1 |
| 6,101,987 A * | 8/2000 | Saur et al. | 123/41.1 |
| 6,109,219 A * | 8/2000 | Sano | 123/41.1 |
| 6,505,580 B2 * | 1/2003 | Chamot et al. | 123/41.1 |
| 6,666,176 B2 * | 12/2003 | Shinpo et al. | 123/41.1 |
| 6,889,633 B2 * | 5/2005 | Murakami et al. | 123/41.1 |
| 2004/0011304 A1 * | 1/2004 | Herynek et al. | 123/41.1 |
| 2005/0034688 A1 * | 2/2005 | Lelkes et al. | 123/41.01 |
| 2006/0213461 A1 * | 9/2006 | Hayami | 123/41.15 |
| 2007/0029396 A1 * | 2/2007 | Braun et al. | 236/34.5 |

FOREIGN PATENT DOCUMENTS

| | | |
|---|---|---|
| DE | 10 2004 008 170 | 9/2005 |
| EP | 1 279 801 | 1/2003 |
| FR | 2 456 838 | 12/1980 |

* cited by examiner

*Primary Examiner* — Marguerite McMahon
*Assistant Examiner* — James Kim
(74) *Attorney, Agent, or Firm* — Oblon, Spivak, McClelland, Maier & Neustadt, L.L.P.

(57) ABSTRACT

A device for controlling opening of a cooling circuit control valve system of an internal combustion engine, containing a coolant, which is automatically opened under effect of a cooling liquid being heated to a standard temperature. The control performs an early controlled opening of the control valve system of a cooling circuit located upstream of a heat exchanger before the temperature of the cooling liquid reaches a set temperature value for activating the opening of the control valve system, which is itself lower than the standard temperature, the controlled opening being performed only when the control valve system is first opened.

14 Claims, 3 Drawing Sheets

METHOD AND DEVICE FOR CONTROLLING THE INITIAL OPENING OF A THERMOSTAT REGULATING THE TEMPERATURE OF AN INTERNAL COMBUSTION ENGINE

BACKGROUND

The present invention relates to the field of engine control, and more particularly to a method and a device for controlling the first opening of an electronic thermostat regulating the temperature of an internal combustion engine, particularly of a vehicle.

Engine control is the technique of managing an internal combustion engine with all its sensors, actuators and inter-system links (ISL). All the monitoring and control laws (the software strategies) and characterization parameters (calibrations) of an engine are contained in a computer called an electronic control unit (ECU).

Internal combustion engines (with a carburetor or with fuel injection), require cooling that is generally obtained by circulating water or air. This is because an internal combustion engine generates heat. This heat is due to the combustion of the gases and to the various frictions of the moving parts.

In order to confine the expansion between permissible temperature ranges and to preserve the characteristics of the lubricating oil, the engine must therefore be cooled. This cooling is achieved by means of three fluids present in the environment:

Air is essentially used for the heat exchangers (radiator, air—air heat exchangers), and for the natural cooling of the heat generated by conduction on the outside of the engine and of the exhaust.
  Water cools the cylinders and the cylinder head.
  Oil removes the heat from the pistons, the camshaft, the big ends, the crankshaft bearings, the valves.

When water is circulated, the water generally flows in a closed circuit and is cooled in a radiator, which is itself cooled by air whereof the flow may be assisted by a fan. Since the heat to be removed depends on the speed and load of the internal combustion engine and since the temperature thereof must be kept within a relatively narrow range to obtain optimal efficiency, the cooling system must be regulated. For this purpose, it is necessary to determine a regulation temperature with a setpoint to guarantee an optimal operating temperature for the engine.

One objective of this regulation is to decrease the fuel consumption and thereby obtain a commensurate decrease in the formation of pollutants such as nitrogen oxides.

In fact, at low temperature, the lubricating oil of the internal combustion engine has a high viscosity, which causes additional friction in the engine and consequently extra fuel consumption. This occurs in particular upon starting the vehicle when the internal combustion engine and the oil are cold.

The production of nitrogen oxides (NOX) depends in particular on the temperature of the gas mixture introduced into the cylinders of the vehicle internal combustion engine. The higher the mixture temperature, the greater the production of nitrogen oxides.

Thus by increasing the temperature of the engine cooling water, the oil temperature is thereby increased and the friction losses are reduced, whereas a lower temperature will limit the production of nitrogen oxide in particular. It is therefore important to maintain the engine at an optimal temperature. Hence the advantage of the cooling circuit. Thus, most vehicles today are equipped with a conventional thermostat operating on the principle of the expansion of a volume of wax. This thermostat may be placed at the outlet or inlet of the engine. Under the effect of the water temperature, a wax plug, through its thermal expansion calibrated against a temperature point, controls the opening of one or two check valves via a working piston. The one or two valves will open or close or regulate the coolant circulation, and optionally a bypass circuit.

Yet a problem arises particularly during the first starting of the vehicle. In fact, during the cold starting, the coolant circumvents the main radiator via a bypass to return directly into the internal combustion engine, entering the lower part thereof, that is in the engine block. When the coolant temperature rises, a valve opens a second coolant path passing through the main radiator, which cooperates with a fan to extract the surplus heat from the coolant.

Before the valve opens, the temperature difference on either side of the thermostat is amplified as the engine temperature rises. When the valve opens for the first time, a thermal shock is therefore produced. Once the coolant circulation is produced, the coolant does not fall back to the initial temperature. Even if the engine undergoes another thermal shock, the greater therefore occurs upon the first opening of the thermostat.

This thermal shock has negative effects on the auxiliary components surrounding the engine and, in particular, the cooling systems for the engine itself and other cooling systems (passenger compartment unit heater, EGR heat exchangers, water/oil heat exchangers, air conditioning radiator and its condenser, turbocharging air, BVA radiator, etc.) which are vulnerable to changes or passages from one temperature to another engine operating temperature setpoint, generating additional stresses thereon. Similarly, the position at the various elements with regard to each other has an influence on the quality of the temperature regulation and the associated stresses. For example, if the cooling circuit valve control system is located at the inlet or outlet of the engine.

These additional stresses cause deformations of the auxiliary components of the engine generated by temperature variations and result in additional mechanical forces.

Patent US 2002/0053325 proposes a solution to this problem with a device for regulating the engine temperature by controlling the coolant circulation between the engine and a heat exchanger such as a radiator. This device comprises a first conventional thermostat as described previously, of which the activation temperature is around 102° C., and a thermostat comprising a central resistor and of which the activation temperature is 25° C. higher than that of the first thermostat, and is therefore around 127° C. These two thermostats each control a different opening of a valve enabling the coolant to enter the radiator to be cooled. Thus when the coolant temperature reaches the first activation temperature, the expansible material contained in the first thermostat activates a piston which itself opens a valve thereby enabling the coolant to flow via the radiator at a certain flow rate. If the liquid temperature is higher and is about 127° C., the expansible material contained in the second thermostat activates a second piston which allows a wider opening of the valve. The liquid thus flows with a higher flow rate to the radiator, so that within the same time interval a larger quantity of liquid will be cooled. This device therefore serves to cool the liquid faster and thereby to prevent the engine from remaining at an excessively high temperature for too long.

However, one drawback of the device is that it only acts when the temperature of the engine is higher than an ideal operating temperature, which is about 90° C. (or according to the rating of the thermostat). It does not help to avoid the thermal shock. The various parts of the engine concerned by this overheating are therefore subject to the stresses and deformations mentioned above.

BRIEF SUMMARY

It is therefore the object of the present invention to reduce the drawbacks by a device whereof the control adapted to the valve control system (a thermostat here) serves to reduce the amplitude of the thermal shock on the components by performing a control according to a criterion selected with regard to the coolant temperature and by monitoring the effective opening of the valve control system, also with regard to the temperature.

For this purpose, the invention proposes a device for controlling the opening of a cooling circuit control valve system of an internal combustion engine, the control valve system being placed on a line connecting the engine to a radiator, the line comprising a temperature sensor placed at the outlet of the engine and upstream of the control valve system which is automatically opened under the effect of a heating of the coolant to a standard temperature, characterized in that it comprises means, controlled by computation means placed in a computer, for activating an early controlled opening of the control valve system when the coolant temperature is higher than a predefined activation temperature and safety means for activating the early controlled opening only when the control valve system is opened for the first time.

According to another feature of the invention, the means for activating an early controlled opening of the control valve system consist of a heating resistor which prematurely raises the temperature of a wax plug of the control valve system.

According to another feature of the invention, the computation means placed in the computer consist of at least a first comparator module for comparing the coolant temperature to the activation temperature, a second comparator module for measuring a temperature drop of the coolant after the control valve system is opened and for comparing it to a predefined temperature drop setpoint, a third comparator module for comparing the temperature of the coolant at the engine outlet after the control valve system is opened to a threshold temperature indicating the effective opening of the control valve system and means for storing these various temperature values.

A further purpose of the invention is to propose a method for controlling the opening of a cooling circuit valve control system implementing the device according to the invention, consisting in performing an early controlled opening of the control valve system of a cooling circuit located upstream of a radiator before the temperature of the coolant reaches the temperature for activating the opening of the control valve system, itself lower than the standard temperature, said controlled opening being performed only when the control valve system is opened for the first time, characterized in that it comprises the following steps:

determination of an activation temperature and storage in storage means of a computer,
determination of a temperature drop and storage means of a computer,
determination of the conditions confirming the opening of the control valve system,
measurement of the temperature of the coolant contained in the circuit at the outlet of the engine and downstream of the control valve system with a temperature sensor and storage in storage means of a computer,
activation of the opening of the control valve system when the coolant temperature is higher than the activation temperature,
closure of the control valve system, these steps being performed when the engine is in self-contained mode.

According to another feature of the invention the conditions confirming the opening are the following:
sufficient drop in temperature of the coolant,
coolant temperature higher than a threshold temperature indicating the activation of the control valve system.

According to another feature of the invention the threshold temperature indicating the activation of the control valve system is higher than the activation temperature setpoint.

According to another feature of the invention the temperature drop is sufficient when the difference between the temperature measured upon the opening of the control valve system and the temperature measured after the opening is higher than the predefined temperature drop.

According to another feature of the invention the control valve system is opened by ordering the turning on of heating means located at the control valve system, which makes it reach the standard temperature early, permitting the opening of the control valve system.

According to another feature of the invention the control valve system is closed when the conditions confirming the opening are satisfied, or after a time T if the conditions confirming the opening are not satisfied.

According to another feature of the invention the time T is determined according to the coolant temperature on starting according to a predefined equation and stored in storage means of a computer.

According to another feature of the invention the activation of the opening of the control valve system initializes a safety module at a predefined value indicating the activation of the opening of the control valve system.

According to another feature of the invention the early controlled activation only upon the first opening is provided by the fact that the safety module is at the predefined value indicating the activation of the control valve system, and the fact that the two conditions for implementation are satisfied.

BRIEF DESCRIPTION OF THE DRAWINGS

The invention, with its features and advantages, will appear more clearly from a reading of the description with reference to the appended drawings provided as nonlimiting examples, in which.

DETAILED DESCRIPTION

Figure 1:
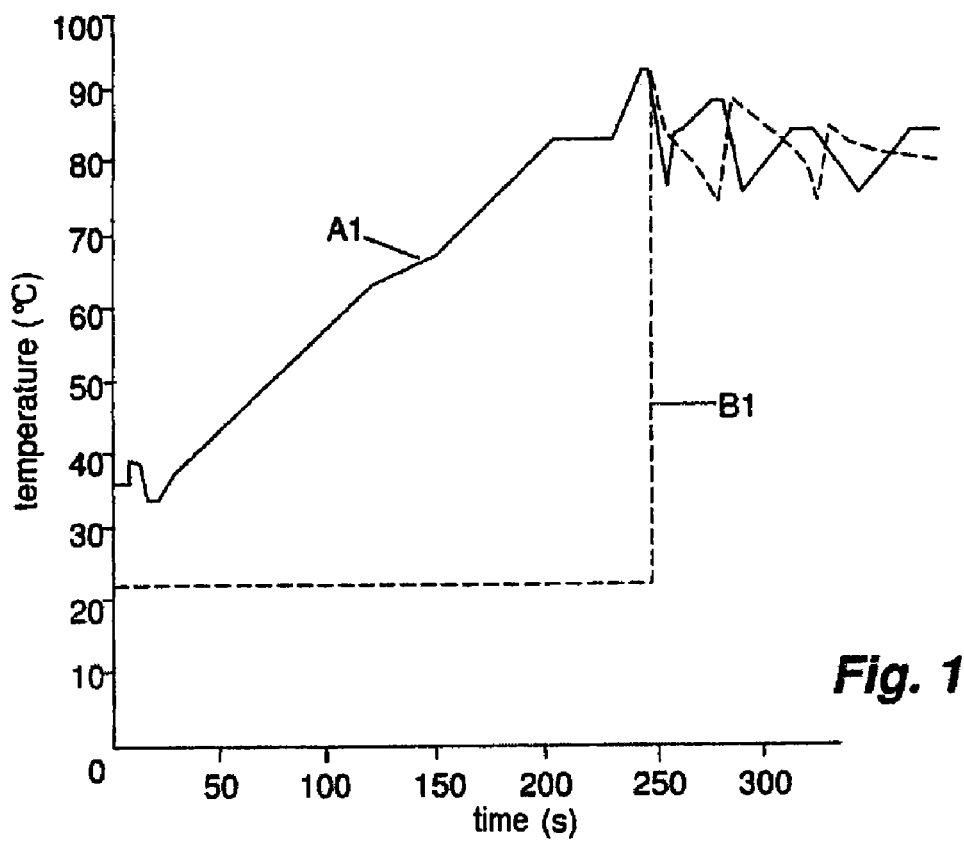
FIG. 1 is a schematic representation of the change in temperature as a function of time for a first uncontrolled opening.

FIG. 1 shows a first opening of the conventional valve control system, that is uncontrolled. In this type of opening, the device for opening the valve control system comprises a conventional thermostat, as shown previously, of which the expansible liquid serves to open a check valve at a given temperature. In the graph in FIG. 1, the curve A1 represents the coolant temperature, as a function of time, corresponding to the temperature rise of the engine from the time of starting.

In the example presented here, the thermostat is set at 90° C. Upon starting, the temperature rises, ordering the opening of the valve control system. This opening allows a passage of the coolant into the heat exchange system, for example a radiator, of which the temperature then increases sharply (shown by the curve B1), while the temperature measured at the engine outlet drops. A very high thermal shock is thus observed (here in the figure, passage from 22° C. to 92° C. or more depending on the engine load, since the thermostat does not have an immediate response).

If the thermostat is set at a higher temperature, 110° C. for example, exactly the same behavior is observed upon the opening of the thermostat and the radiator undergoes a commensurately higher thermal shock: here up to 110° C. instead of 90° C., or more depending on the engine load (since the thermostat does not have an immediate response).

Figure 2:
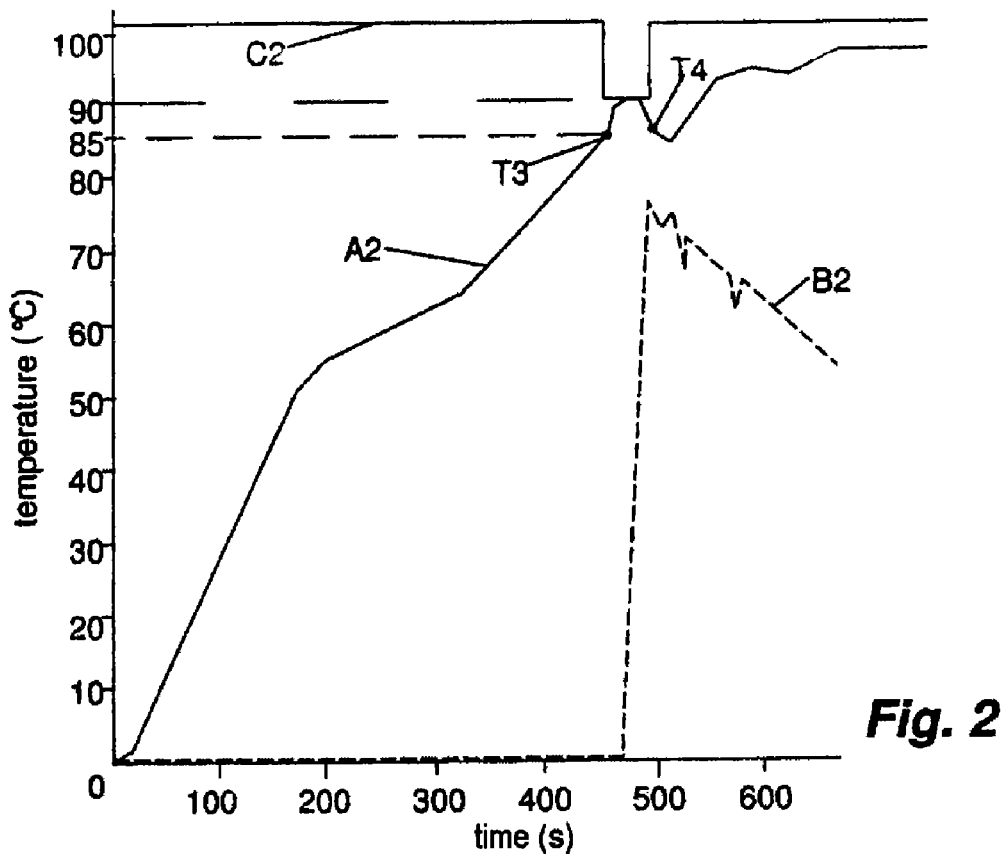
FIG. 2 is a schematic representation of the change in temperature as a function of time for a first controlled opening according to the invention.

FIG. 2 shows a first opening of the valve control system, but controlled this time, with the method and the device according to the invention.

Similarly to the above situation, the curve A2 represents the coolant temperature also corresponding to the temperature rise of the engine from the time of starting. This graph shows that the temperature rise is partly interrupted before reaching the thermostat temperature setpoint (TT), set for example at 110° C. The time when the temperature drops corresponds to the time when the controlled opening is activated, at the time of the change of the thermostat temperature setpoint (TT) (shown by the curve C2), which drops here from 110° C. to 90° C., to avoid reaching an excessively high temperature, and simultaneously to prevent the temperature at the radiator inlet, shown by the curve B2, from rising too much following the opening of the thermostat, which results in a sudden rise in temperature at the radiator inlet.

Figure 3:
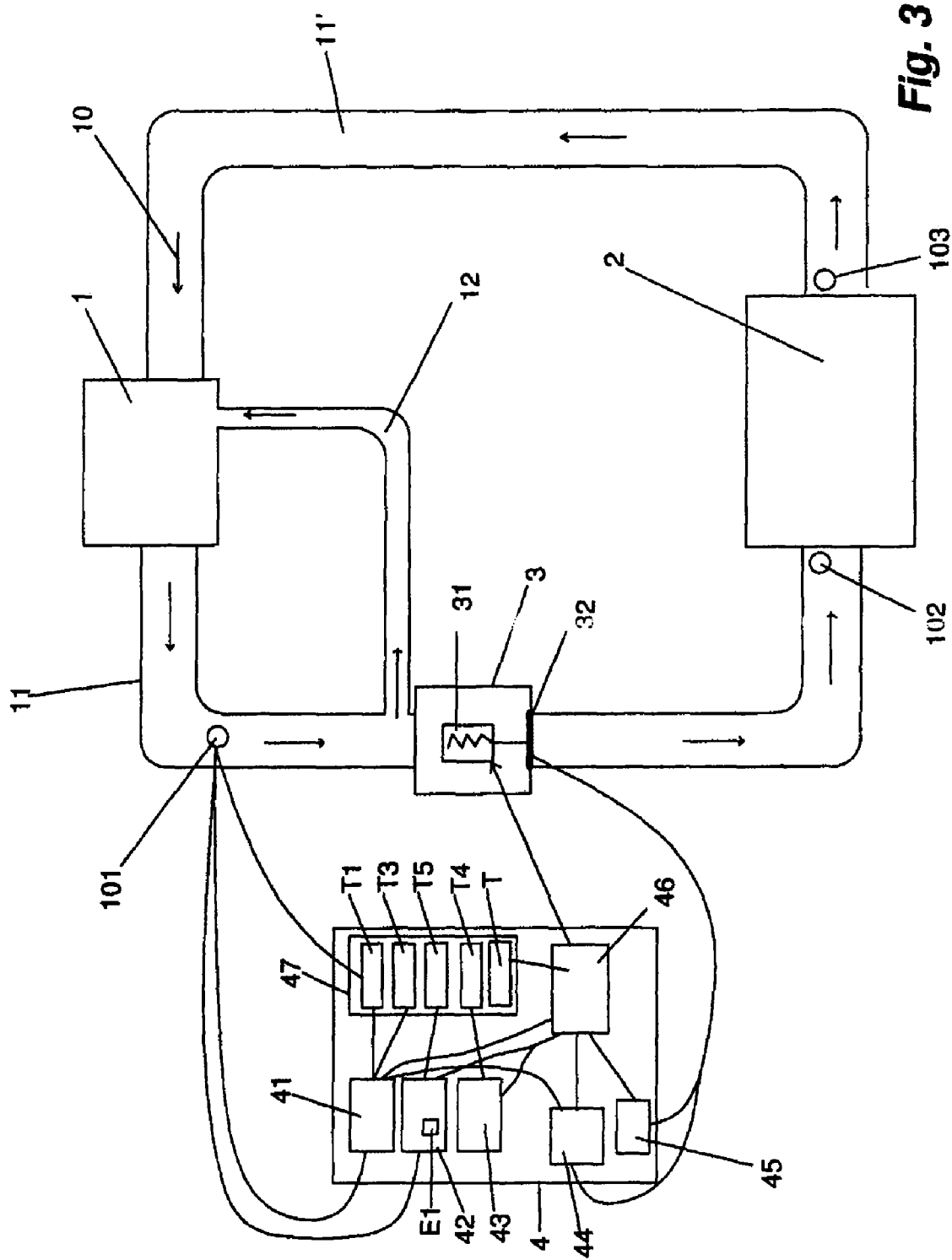
FIG. 3 is a schematic representation of the device according to the invention.

FIG. 3 shows an embodiment of the device according to the invention for obtaining the results shown in FIG. 2. This device comprises an internal combustion engine (1) and a radiator (2) connected together by a line (11, 11') serving for the flow (10) of the coolant, in order to form a loop circuit. This circuit enables the coolant to flow from the engine (1) to the radiator (2) and then to leave the radiator toward the engine via a different path (11'). A second line forms a bypass (12) enabling the coolant to return directly to the engine (1) without passing through the radiator (2). On the route of the first line (11) between the engine (1) and the radiator (2), and after the bypass (12), a thermostat type valve control system (3) is placed. This valve control system (3) shown in the form of a box, comprises a passage (not shown) for the coolant between the engine (1) and the radiator (2), closable by a valve, and an element for thermostatic control of this valve. This thermostatic control element (3) only allows coolant to flow from the engine (1) to the radiator (2) when the latter has reached a certain temperature.

The thermostatic control element is of the same type as previously described. It operates on the principle of the expansion of a volume of wax contained in a plug. Under the effect of the coolant temperature, the wax plug, by its thermal expansion calibrated to a temperature point, commands the opening of a check valve (32) via a working piston. The check valve (32) then opens or closes to regulate the flow of coolant and, optionally, of the bypass circuit (12). In the context of the invention, the thermostat (3) used opens when the coolant temperature reaches a standard temperature setpoint (TT) of 110° C. This thermostat (3) comprises heating means (31), of the resistor type (31), which serves to artificially raise the temperature of the wax and thereby change its temperature setpoint. This means that the thermostat (3), which normally causes an opening of the check valve (32) when the coolant is at 110° C., will now open when the coolant is at 90° C., thanks to the resistor (31) which artificially raises the thermostat to 110° C. The object of this resistor (31) is to enable an early opening of the valve control system (3). This resistor (31) is connected to the computer (4) of the vehicle, which produces the commands required by the method.

The cooling circuit also comprises at least one temperature sensor (101) placed in the line (11) of the cooling circuit at the outlet of the engine (1) and upstream of the valve control system (3). A second sensor (102) may be placed in the line (11) of the cooling circuit downstream of the valve control system (3) and at the inlet of the radiator (2). These two temperature sensors are also connected to the computer (4). The first sensor (101) serves to measure the temperature (T1) of the coolant at the engine outlet. This measurement is sent to the computer (4) which stores it by storage means placed in a storage module (47). The second sensor (102) serves to measure the coolant temperature at the inlet of the radiator (2) or at the outlet (103) of the radiator. Due to its high cost, conventional motor vehicles are not equipped with this second sensor (102) which is only used for the engine test. All the measurements necessary to regulate the engine temperature during the operation of an engine vehicle are therefore taken with the first temperature sensor (101).

Figure 4:
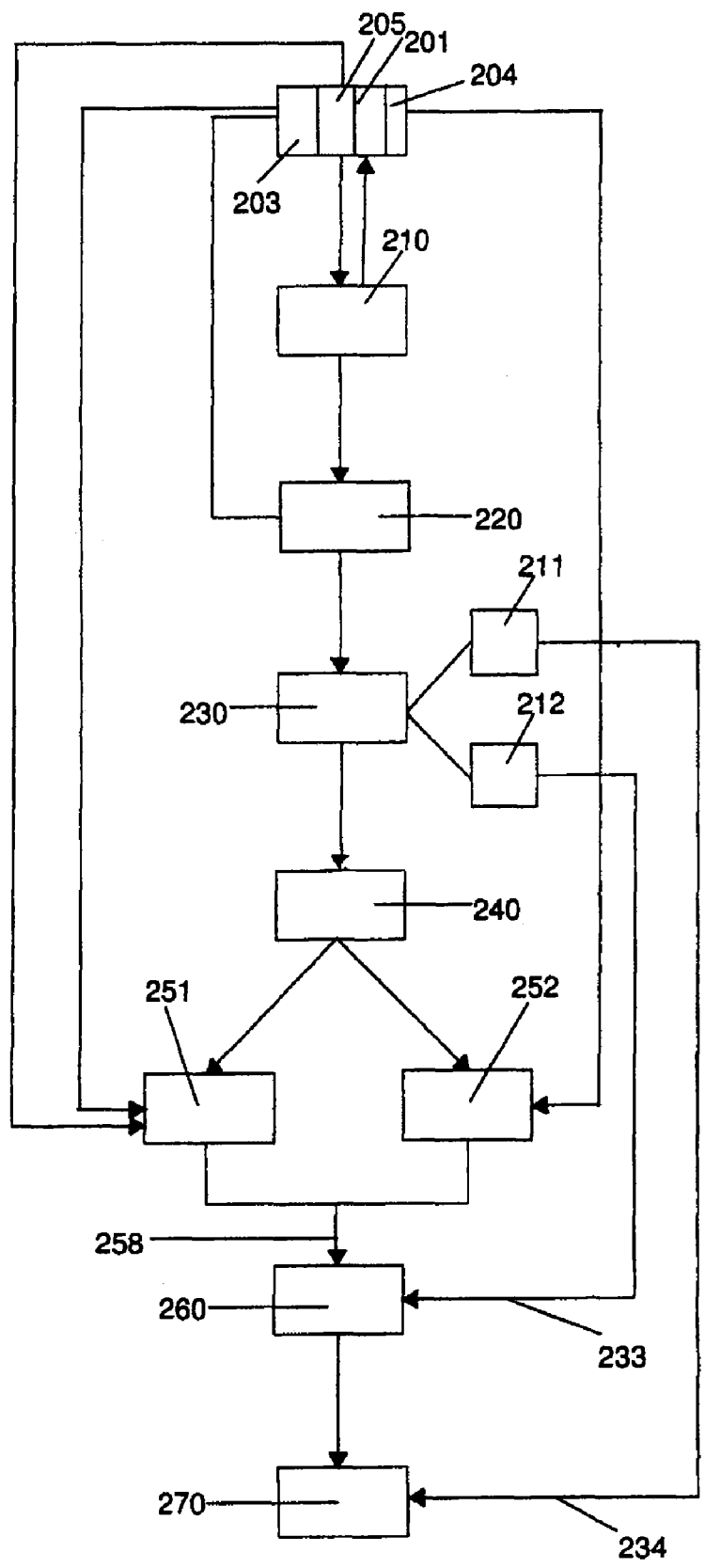
FIG. 4 is a schematic representation of the method according to the invention.

The first sensor (101) is therefore used to measure the coolant temperature (T1) at the engine outlet at the time of starting, that is before the first opening of the valve control system (3), and the coolant temperature (T2) at the engine outlet after the activation (230) of the opening of the valve control system (T2), as shown in FIG. 4.

The temperature (T1) measured at the time of starting is stored in the storage module (47) of the computer (4). It is this temperature (T1) that is compared, thanks to a first comparator module (41) located in the computer (4), with a temperature (T3) of activation of the valve control system (3). This temperature (T3) corresponds to the temperature from which the opening of the valve control system (3) will be activated (230). Since the optimal operating temperature of the engine is about 90° C., the temperature (T3) for activating the opening is between 80° C. and 95° C., and preferably is 85° C. The activation temperature (T3) is set at about 85° C. in the case of a thermostat temperature setpoint of 90° C., in order to allow the resistor (31) the time to heat to initiate the opening (230) when the coolant is at 90° C. In fact, if the activation temperature is set at 90° C., the time required to heat the resistor (31) and the response time of the cooling circuit and thermostat combination, will ensure that the opening takes place when the coolant has exceeded 90° C. This temperature (T3) is stored in the storage module (47) of the computer (4) before the engine (1) is started. Thus, if the temperature (T1) is higher than the activation temperature setpoint (T3), the first comparator (41) sends a signal to a resistance control module (46) in order to change the temperature setpoint (TT) of the thermostat, to lower it from 110° C. to 90° C., that is so that the valve control system (3) opens when the coolant is at 90° C. and no longer at 110° C., serving to turn on the heating resistor (31) in order to artificially raise the temperature of the wax and open the check valve (32).

The coolant temperature (T2) at the engine outlet after the valve control system (3) is opened is measured, with the temperature sensor (101) continuously from the time when the opening is initiated and at least up to the first closure of the valve control system (3).

This temperature (T2) after activation of the opening is analyzed by the computer (4) at a second comparator module (42) of the computer (4). During this analysis the temperature (T2) after the opening is activated is compared to the temperature (T1) before the opening is activated in order to determine a difference (E1) corresponding to a temperature drop. This temperature drop (E1) is then compared to a temperature drop setpoint (T5) prestored in the storage module (47) of the computer (4).

The temperature (T2) is also compared, in the third comparator module (43) of the computer (4), to a threshold temperature (T4) indicating that the opening of the valve control system has been activated. The threshold temperature (T4) indicating the activation of the opening of the valve control system (3) is predefined and is higher than the activation temperature setpoint (T3). It is stored before the operation of the engine in the storage module (47).

The three comparators (41, 42, 43) are connected to the storage module (47).

The comparisons made by the second (42) and the third comparator module (43) are used to determine the closure of the valve control system. In fact, so that the valve control system (3) can be closed, two conditions must be satisfied. The first condition is satisfied when the temperature drop (E1) is higher than the temperature drop setpoint (T5). The second condition is satisfied when the temperature (T2) after opening of the valve control system (3) is higher than the threshold temperature (T4) indicating the activation of the opening of the valve control system (3). When the two conditions are satisfied, a signal is sent to the control module (46) of the heating resistor (31) to turn it off, while the temperature setpoint (TT) of the thermostat again rises from 90° C. to 110° C. Thus the volume of wax, which is no longer heated, decreases and enables the check valve (32) to close. From this time on, the resistor (31) no longer heats and the check valve (32) can only be opened if the coolant temperature rises above 110° C.

If the two conditions are not satisfied, the system is closed after a time T which is predefined and stored in the storage module of the computer. This time T is determined as a function of the coolant temperature upon starting according to a predefined equation, and plays the role of a safety element to prevent the system from remaining open too long. The predefined equation consists of a standard curve indicating the temperature as a function of the opening time and serves to estimate the opening time required to obtain a sufficient temperature drop. To check whether the time T is reached, the computer (4) comprises a meter (44), set to zero before the opening of the valve control system (3), which starts to operate when the opening is activated. For this purpose, a signal is sent via the first comparator (41) to the meter (44). When the meter reaches the time T the valve control system (3) is closed.

The computer (4) also comprises safety means for ensuring that the first opening is only activated once after starting. The safety means consists on the one hand of the satisfaction of the two conditions indicating the opening of the valve control system (3). And on the other, in checking that the value of a safety module (45) is set at a predefined value during the opening of the valve control system (3). If the value of the module corresponds to the predefined value and if the two conditions indicating the opening of the valve control system (3) are satisfied, the safety means is then activated.

In an alternative embodiment, the meter (44) can be used as a safety module (44), by checking that it is no longer at the value zero.

The operation of this device illustrated in FIG. 4 will now be described in detail.

Before starting the engine (1), the values of the activation temperature (T3), the activation threshold (T4) and the temperature drop setpoint (T5) are determined and stored (203, 204, 205) in the storage module (47) of the computer.

Upon starting the engine (1), the temperature thereof rises rapidly and the coolant temperature (T1) at the outlet of the engine (1) also rises. This temperature (T1) is measured (210) at the engine outlet by the temperature sensor placed in the line of the cooling circuit and is stored (210) in the storage module (47) of the computer (4). The first comparator module (41) uses this temperature to compare it (220) with the activation temperature (T3). If the starting temperature (T1) is higher than the activation temperature (T3), which is 85° C., and if the engine (1) is in self-controlled operating mode, the opening process (230) is initiated. The engine (1) is in self-contained mode when the ignition is turned on and when the starter is no longer necessary. At this moment, the first comparator (41) sends a signal to the resistor control module (46) which lowers the temperature setpoint from 110° C. to 90° C. and therefore turns on the resistor (31) located in the thermostat (3). The heat generated by the resistor (31) causes the opening of the check valve (32) of the valve control system. The coolant will then flow toward the radiator (2) to be cooled therein. The liquid thus cooled by the radiator (2) flows to the engine (1) inside the line (11') connecting the radiator (2) to the engine (1) and, in turn, cools the engine (1). The coolant temperature (T2) is then measured (240) after the opening (230) is activated. To ensure that the temperature drop of the engine is not excessive, that is that it does not fall below the optimal operating temperature threshold of the engine, the system (3) will then be closed (260).

For the process of closure (260) of the valve control system (3) to be initiated, two conditions confirming the opening of the valve control system must be satisfied.

The first condition (251) is that the temperature drop (E1) of the coolant after opening must be sufficient, that is higher than the predefined minimum temperature drop setpoint (T5). The temperature drop corresponds to the difference between the coolant temperature (T1) at the time of opening of the valve control system (3) and the coolant temperature (T2) after the opening of the valve control system (3), and after having passed through the radiator and the engine. The second condition (252) is that the temperature (T2) of the cooling system after opening must be higher than the threshold temperature (T4) indicating the activation of the system. In this way, the temperature does not fall back below the activation threshold.

When the two conditions are satisfied (258), the valve control system (3) closes (260) and the temperature thus remains at a value allowing optimal operation of the engine.

If the two conditions are not satisfied, the valve control system will nevertheless be closed. For this purpose, the device uses (233) the meter (44) activated during the opening (230) of the valve control system (3) and the predefined time T with the coolant temperature (T1) at starting. This means that if these conditions are not satisfied after the time T, the meter (44) sends (233) a signal to the control module (46) of the resistor (31) so that it is turned off. This meter (44) plays a safety role to prevent the system from remaining open for too long.

For the valve control system to close (260), the control module (46) which has received the necessary signals, raises the thermostat temperature setpoint from 90° C. to 110° C., thereby causing the resistor (31) to be turned off, thereby enabling the closure of the check valve (32).

When the valve control system (3) is closed (260), the coolant flows via the bypass (12) to reach the engine (1).

It is provided that this method is only activated once (270) per driving cycle. For this purpose, during the activation (210)

of the first opening of the valve control system, the safety module (45) has assumed (231) a value indicating the opening (230) of the valve control system (3). Thus, if this safety module (45) is at the predefined value (234) and if the two conditions (258) for implementation are satisfied, the system can no longer be reactivated.

The operation of the device according to the invention thus comprises the following steps:

- determination (203) of an activation temperature (T3) and storage (203) in storage means (47) of a computer (4),
- determination (205) of a temperature drop (T5) and storage means (47) of a computer (4),
- determination of the conditions confirming the opening of the control valve system,
- measurement (210) of the temperature (T1) of the coolant contained in the circuit at the outlet of the engine (1) and downstream of the control valve system (3) with a temperature sensor (101) and storage (201) in storage means (47) of a computer (4),
- activation of the opening (230) of the control valve system (3) when the coolant temperature (T1) is higher than the activation temperature (T3),
- closure (270) of the control valve system.

In the case presented here, the valve control system (3) is of the thermostat type, but other coolant valve control systems can be used, such as, for example, an electrically controlled valve, allowing the regulation of other additional criteria besides the temperature.

It must be obvious to a person skilled in the art that the present invention is suitable for embodiments in many other specific forms without departing from the field of application of the invention as claimed. In consequence, the present embodiments must be considered as illustrations, but can be modified in the field defined by the scope of the appended claims, and the invention must not be limited to the details given above.

The invention claimed is:

1. A device for controlling opening of a cooling circuit control valve system of an internal combustion engine, the control valve system being placed on a line connecting the engine to a radiator, the line including a temperature sensor placed at an outlet of the engine and upstream of the control valve system, which is automatically opened under effect of a heating of coolant to a standard temperature, the device comprising:
    means, controlled by computation means in a computer, for activating an early controlled opening of the control valve system when the coolant temperature is higher than a predefined activation temperature; and
    safety means configured to check a value of a safety module and to prevent another occurrence of the early controlled opening of the control valve system if the value of the safety module indicates that the early controlled opening has already occurred since the engine was started such that the early controlled opening is only activated when the control valve system is opened for a first time.

2. The device for controlling the opening of a cooling circuit valve control system as claimed in claim 1, wherein the means for activating an early controlled opening of the control valve system includes a heating resistor that prematurely raises a temperature of a wax plug of the control valve system, causing opening of a check valve.

3. The device for controlling the opening of a cooling circuit valve control system as claimed in claim 1, wherein the computation means in the computer includes at least a first comparator module that compares the coolant temperature to the activation temperature, a second comparator module that measures a temperature drop of the coolant after the control valve system is opened and that compares it to a predefined temperature drop setpoint, a third comparator module that compares the temperature of the coolant at the engine outlet after the control valve system is opened to a threshold temperature indicating an effective opening of the control valve system, and means for storing these temperature values.

4. A method for controlling opening of a cooling circuit valve control system, the method performing an early controlled opening of the control valve system of a cooling circuit located upstream of a radiator before a temperature of coolant reaches a temperature for activating the opening of the control valve system, the temperature of the coolant being lower than a standard temperature, the method comprising:
    determining an activation temperature and storing the determined activation temperature in a storage of a computer;
    determining a temperature drop and storing the determined temperature drop in the storage of the computer;
    determining conditions confirming opening of the control valve system;
    measuring the temperature of the coolant contained in the circuit at an outlet of the engine and downstream of the control valve system with a temperature sensor, and storing the measured temperature in the storage of the computer;
    checking a value of a safety module;
    if the value of the safety module indicates that the early controlled opening has already occurred since the engine was started, preventing another occurrence of the early controlled opening of the control valve system;
    if the value of the safety module indicates that the early controlled opening has not occurred since the engine was started, activating the opening of the control valve system when the coolant temperature is higher than the activation temperature; and
    after the activating the opening of the control valve system, closing the control valve system;
    these operations being performed when the engine is in self-contained mode.

5. The method of controlling the opening of a cooling circuit control valve system as claimed in claim 4, wherein the conditions confirming the opening are:
    a sufficient drop in the temperature of the coolant, and
    the coolant temperature is higher than a threshold temperature indicating the activation of the control valve system.

6. The method of controlling opening of a cooling circuit control valve system as claimed in claim 5, wherein the threshold temperature indicating the activation of the control valve system is higher than the activation temperature.

7. The method of controlling opening of a cooling circuit control valve system as claimed in claim 5, wherein the temperature drop is sufficient when the difference between the temperature measured before the opening of the control valve system and the temperature measured after the opening is higher than a predefined temperature drop.

8. The method of controlling opening of a cooling circuit control valve system as claimed in claim 4, wherein the control valve system is opened by ordering turning on of a heater located at the control valve system, which makes the control valve system reach the standard temperature early, permitting the opening of the control valve system.

9. The method of controlling opening of a cooling circuit control valve system as claimed in claim 4, wherein the control valve system is closed when the conditions confirming the opening are satisfied, or after a time if the conditions confirming the opening are not satisfied.

10. The method of controlling the opening of a cooling circuit control valve system as claimed in claim 9, wherein the time is determined as a function of the coolant temperature on starting according to a predefined equation stored in the storage of the computer.

11. The method of controlling the opening of a cooling circuit control valve system as claimed in claim 4, wherein the activating the opening of the control valve system initializes the safety module to the value indicating the activation of the opening of the control valve system has occurred.

12. The method of controlling the opening of a cooling circuit control valve system as claimed in claim 4, wherein the activating the opening of the control valve system includes prematurely raising a temperature of a wax plug of the control valve system via a heating resistor, causing opening of a check valve.

13. The method of controlling the opening of a cooling circuit control valve system as claimed in claim 4, further comprising:
    comparing the coolant temperature to the activation temperature via a first comparator module of the computer;
    measuring the temperature drop of the coolant after the control valve system is opened and comparing the measured temperature drop to a predefined temperature drop setpoint via a second comparator module of the computer;
    comparing the temperature of the coolant at the engine outlet after the control valve system is opened to a threshold temperature indicating effective opening of the control valve system via a third comparator module of the computer; and
    storing these temperature values in the storage of the computer.

14. The device for controlling the opening of a cooling circuit valve control system as claimed in claim 1, wherein the safety means sets the value of the safety module to the value that indicates that the early controlled opening has already occurred when conditions confirm the early controlled opening has occurred, the conditions confirming the opening are:
    a sufficient drop in the temperature of the coolant, and
    the coolant temperature is higher than a threshold temperature indicating the activation of the control valve system.

* * * * *

UNITED STATES PATENT AND TRADEMARK OFFICE
CERTIFICATE OF CORRECTION

| | | |
|---|---|---|
| PATENT NO. | : 8,201,524 B2 | |
| APPLICATION NO. | : 12/161590 | |
| DATED | : June 19, 2012 | |
| INVENTOR(S) | : Christophe Mounetou et al. | |

It is certified that error appears in the above-identified patent and that said Letters Patent is hereby corrected as shown below:

On the title page, Item (86), the Application Filing Date should read:

--(86)  PCT No.:  PCT/FR2007/050662

§ 371 (c)(1),
(2), (4) Date:  Oct. 3, 2008--

Signed and Sealed this
Fourteenth Day of August, 2012

David J. Kappos
*Director of the United States Patent and Trademark Office*